US012438408B2

(12) United States Patent
Thomas et al.

(10) Patent No.: US 12,438,408 B2
(45) Date of Patent: Oct. 7, 2025

(54) INDUCTION MOTOR

(71) Applicant: Entuple E-Mobility Pvt Ltd, Bangalore (IN)

(72) Inventors: Tijo Thomas, Trivandrum (IN); Vitthal Shreepad Deexit, Bangalore (IN)

(73) Assignee: Entuple E-Mobility Pvt. Ltd. (IN)

(*) Notice: Subject to any disclaimer, the term of this patent is extended or adjusted under 35 U.S.C. 154(b) by 0 days.

(21) Appl. No.: 18/259,285

(22) PCT Filed: Dec. 24, 2021

(86) PCT No.: PCT/IB2021/062295
§ 371 (c)(1),
(2) Date: Jun. 26, 2023

(87) PCT Pub. No.: WO2022/137209
PCT Pub. Date: Jun. 30, 2022

(65) Prior Publication Data
US 2024/0313610 A1    Sep. 19, 2024

(30) Foreign Application Priority Data
Dec. 24, 2020    (IN) .............................. 202041056383

(51) Int. Cl.
*H02K 1/18*    (2006.01)
*H02K 1/26*    (2006.01)
(Continued)

(52) U.S. Cl.
CPC ............. *H02K 1/185* (2013.01); *H02K 1/265* (2013.01); *H02K 5/207* (2021.01); *H02K 17/20* (2013.01)

(58) Field of Classification Search
CPC .......... H02K 1/185; H02K 1/265; H02K 1/28; H02K 17/20; H02K 2213/03; H02K 5/203; H02K 5/207
See application file for complete search history.

(56) References Cited

U.S. PATENT DOCUMENTS 4,987,330 A * 1/1991 Murphy ................... H02K 1/28
310/216.123
8,970,075 B2    3/2015 Rippel et al.
(Continued)

FOREIGN PATENT DOCUMENTS

CN    107017729 A    8/2017
CN    108199535 A    6/2018
TW    541779 B *    7/2003    ............. H02K 1/185

OTHER PUBLICATIONS

TW-541779-B, all pages (Year: 2003).*

*Primary Examiner* — Naishadh N Desai
(74) *Attorney, Agent, or Firm* — Jason C. Cameron

(57) ABSTRACT

An induction motor is disclosed. The induction motor comprises a stator body assembly. The stator body assembly is characterized by a hollow cylindrical stator stack and a set of intertwined stator rods. The hollow cylindrical stator stack is fabricated with a plurality of rectangular shaped open slots on inner surface periphery and a plurality of cleating notches on outer surface periphery. The induction motor also comprises a rotor body assembly. The rotor body assembly is housed within the stator body assembly and configured to mount over multi-step shaft of the induction motor. The rotor body assembly is characterized by a hollow cylindrical rotor stack fabricated with a plurality of predesigned rotor slots on outer surface periphery, a plurality of vent holes and a notch on inner surface periphery. The rotor body assembly is also characterized by a set of rotor bars, housed within the plurality of predesigned rotor slots.

7 Claims, 17 Drawing Sheets

(51) Int. Cl.
*H02K 5/20* (2006.01)
*H02K 17/20* (2006.01)

(56) References Cited

U.S. PATENT DOCUMENTS

| | | |
|---|---|---|
| 9,948,158 B2 | 4/2018 | Lin et al. |
| 10,177,630 B2 | 1/2019 | Luise et al. |
| 2016/0372982 A1* | 12/2016 | Sailor ................. H02K 3/24 |

* cited by examiner

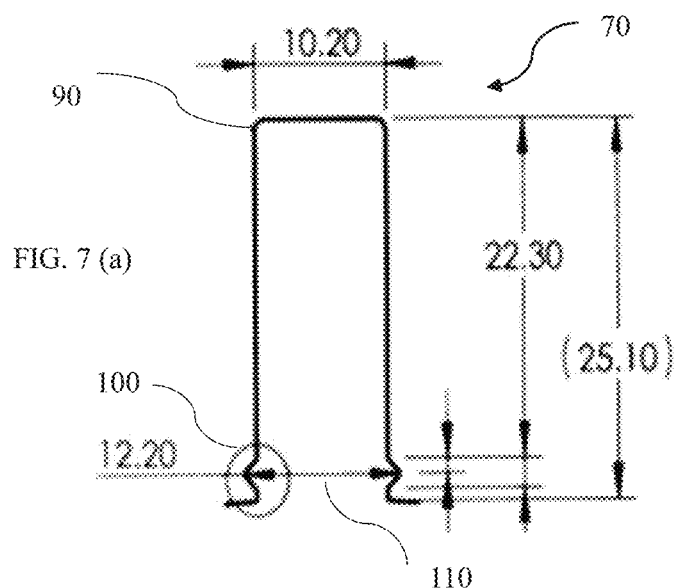
FIG. 7 (a)
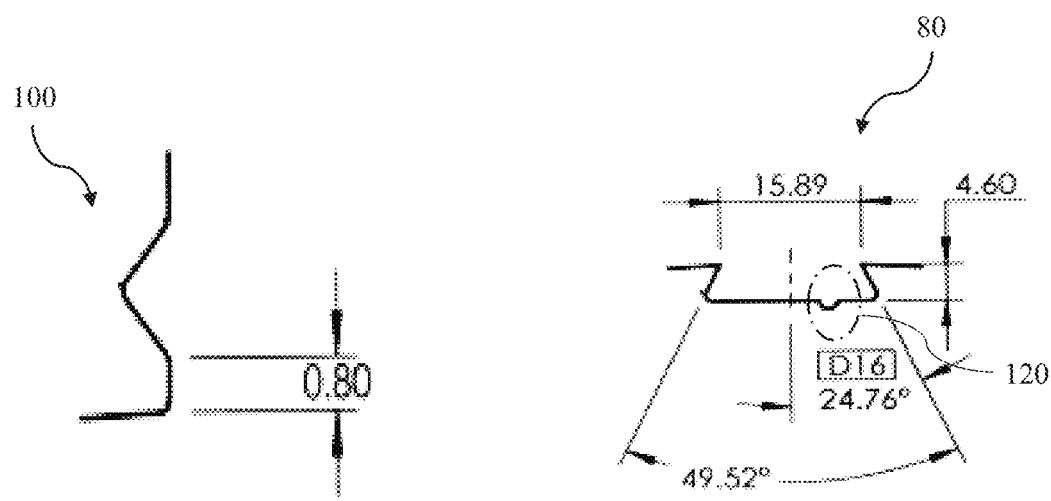
FIG. 7 (b)
FIG. 7 (c)

INDUCTION MOTOR

EARLIEST PRIORITY DATE

This Application claims priority from a complete patent application filed in India having Patent Application No. 202041056383, filed on Dec. 24, 2020, and titled "INDUCTION MOTOR" and PCT Application bearing number "PCT/IB2021/062295" filed on Dec. 24, 2021, and titled "INDUCTION MOTOR".

FIELD OF INVENTION

Embodiments of a present disclosure relates to an induction machine, and more particularly to an induction motor having specific designed stator, rotor and shaft assembly.

BACKGROUND

An induction motor generally comprises a stator which generates a revolving magnetic field inside a cavity and a rotor which is rotatably arranged inside the cavity of the stator. The rotor rotates by interaction with the magnetic field generated by the stator.

In conventionally designed induction motor, a stator comprises a stator stack defining the cavity and a stator winding which is wound on the inner peripheral portion of the stator stack. A magnetic field is generated inside the cavity, when current flow through the stator winding. Similarly, a rotor comprises a rotor stack and a rotor cage with a rotary shaft.

Here, whole stator and rotor components need to be compactly coupled to provide efficient motor operation. For proper operation of a motor at high torque, the conventional designs also lack structural adequacy between the stator and rotor assembly for implementation in automotive sector such as electric vehicles. Such inefficient coupling introduces stress and deformation to the motor structure. Further, induction motors available in market also need to have an efficient thermal management, if implemented in electric vehicles. Therefore, an effective cooling mechanism has to be implemented for cooling the high temperature as generated during rotating rotor movement.

Hence, there is a need for a structurally improved induction motor to address the aforementioned issues.

BRIEF DESCRIPTION

In accordance with one embodiment of the disclosure, an induction motor is disclosed. The induction motor comprises a stator body assembly. The stator body assembly is characterized by a hollow cylindrical stator stack. The hollow cylindrical stator stack is fabricated with a plurality of rectangular shaped open slots on inner surface periphery and a plurality of cleating notches on outer surface periphery.

The plurality of rectangular shaped open slots is equispaced and distributed around the hollow cylindrical stator stack. Each of the plurality of cleating notches are equispaced and distributed around the hollow cylindrical stator stack. Furthermore, stator body assembly is also characterized by a set of intertwined stator rods. The set of intertwined stator rods is configured as stator windings and housed within the plurality of rectangular shaped open slots. Each rod of the set of intertwined stator rods is being aligned along two v-shaped depressions of each of plurality of rectangular shaped open slots.

The induction motor also comprises a rotor body assembly. The rotor body assembly is housed within the stator body assembly and configured to mount over shaft of the induction motor. The rotor body assembly is characterized by a hollow cylindrical rotor stack fabricated with a plurality of predesigned rotor slots on outer surface periphery, a plurality of vent holes and a notch of predefined dimension on inner surface periphery.

Each of the plurality of predesigned rotor slots are equispaced and distributed around the hollow cylindrical rotor stack. Each of the plurality of vent holes of pre-defined diameter are equispaced and distributed around the hollow cylindrical rotor stack. The plurality of vent holes is configured to provide air ventilation pathways for cooling of rotor body assembly. The rotor body assembly is also characterized by a set of rotor bars configured as rotor windings and housed within the plurality of predesigned rotor slots.

The induction motor also comprises the shaft of predefined diameter and fabricated with a rectangular depression for proper alignment with the notch on inner surface periphery of the rotor body assembly.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 7 (a) is an exemplary line drawing representation of an embodiment representing a single rectangular shaped open slot corresponding to the hollow cylindrical stator stack in accordance with the present disclosure;

FIG. 7 (b) is an exemplary line drawing representation of an embodiment representing a v-shaped depression corresponding to the single rectangular shaped open slot of FIG. 6 in accordance with the present disclosure;

FIG. 7 (c) is an exemplary line drawing representation of an embodiment representing a single cleating notch with c-shaped depression in accordance with the present disclosure:

FIG. 12 (b) is an exemplary line drawing representation of an embodiment representing upper circular portion of the single predesigned rotor slot corresponding to the hollow cylindrical rotor stack in accordance with the present disclosure; and FIG. 12 (c) is an exemplary line drawing representation of an embodiment representing a notch along with c-shaped depression in accordance with the present disclosure;

FIG. 13 (b) is an exemplary line drawing side representation of the shaft in accordance with the present disclosure;

FIG. 13 (c) is an exemplary line drawing horizontal representation of the shaft in accordance with the present disclosure:

Figure 1:
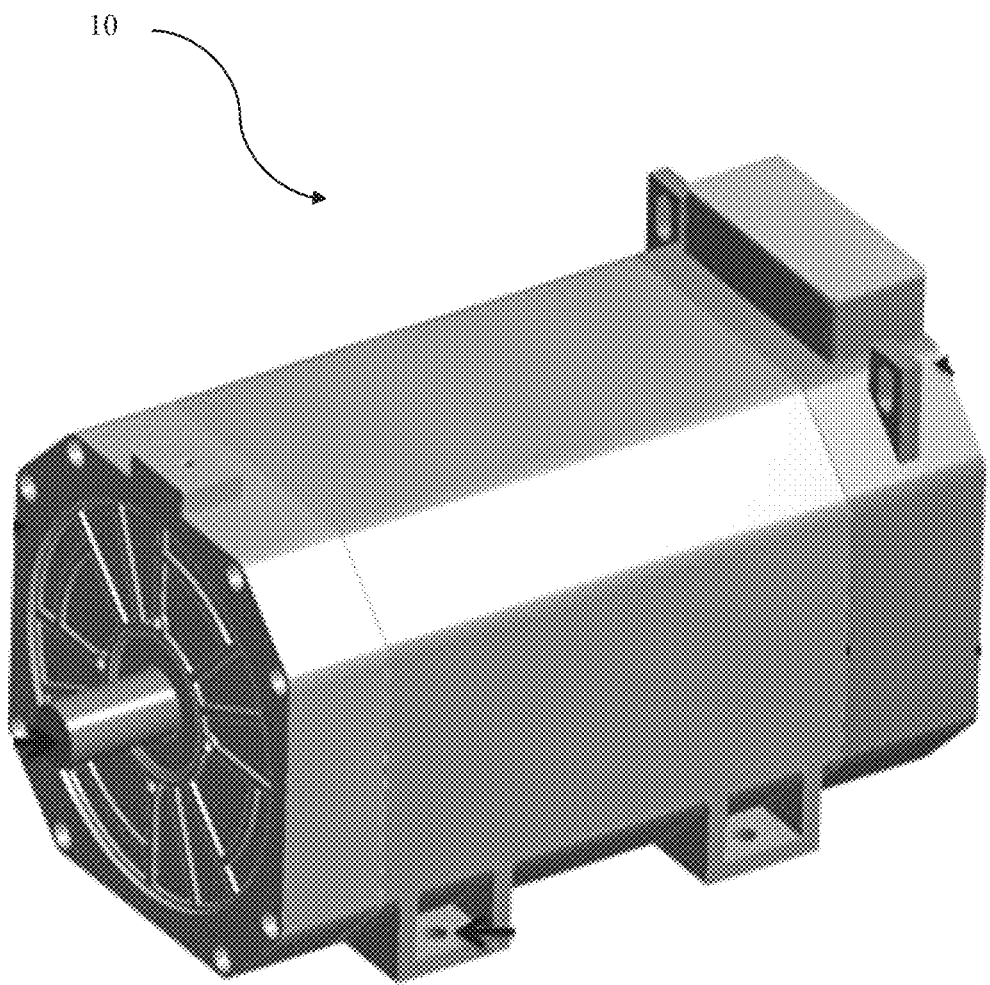
FIG. 1 is a schematic representation of an induction motor in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe therm. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises". "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises ... a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relates to an induction motor. The induction motor comprises a stator body assembly. The stator body assembly is characterized by a hollow cylindrical stator stack. The hollow cylindrical stator stack is fabricated with a plurality of rectangular shaped open slots on inner surface periphery and a plurality of cleating notches on outer surface periphery.

The plurality of rectangular shaped open slots is equispaced and distributed around the hollow cylindrical stator stack. Each of the plurality of cleating notches are equispaced and distributed around the hollow cylindrical stator stack. Furthermore, stator body assembly is characterized by a set of intertwined stator rods. The set of intertwined stator rods is configured as stator windings and housed within the plurality of rectangular shaped open slots.

The induction motor also comprises a rotor body assembly. The rotor body assembly is housed within the stator body assembly and configured to mount over shaft of the induction motor. The rotor body assembly is characterized by a hollow cylindrical rotor stack, fabricated with a plurality of predesigned rotor slots on outer surface periphery, a plurality of vent holes and a notch of predefined dimension on inner surface periphery.

Each of the plurality of predesigned rotor slots are equispaced and distributed around the hollow cylindrical rotor stack. Each of the plurality of vent holes of pre-defined diameter are equispaced and distributed around the hollow cylindrical rotor stack. The rotor body assembly is characterized by a set of rotor bars configured as rotor windings and housed within the plurality of predesigned rotor slots.

The induction motor also comprises the shaft of predefined diameter and fabricated with a rectangular depression for proper alignment with the notch on inner surface periphery of the rotor body assembly.

FIG. 1 is a schematic representation of an induction motor 10 in accordance with an embodiment of the present disclosure. Any induction motor 1) is basically divided into two essential components, that is a stator and a rotor (not shown in FIG. 1). The induction motor 10 works on the principle of electromagnetic induction. In induction motor 10 operation, electric current in the rotor needed to produce torque is obtained via electromagnetic induction from the rotating magnetic field of the stator winding.

Figure 2:
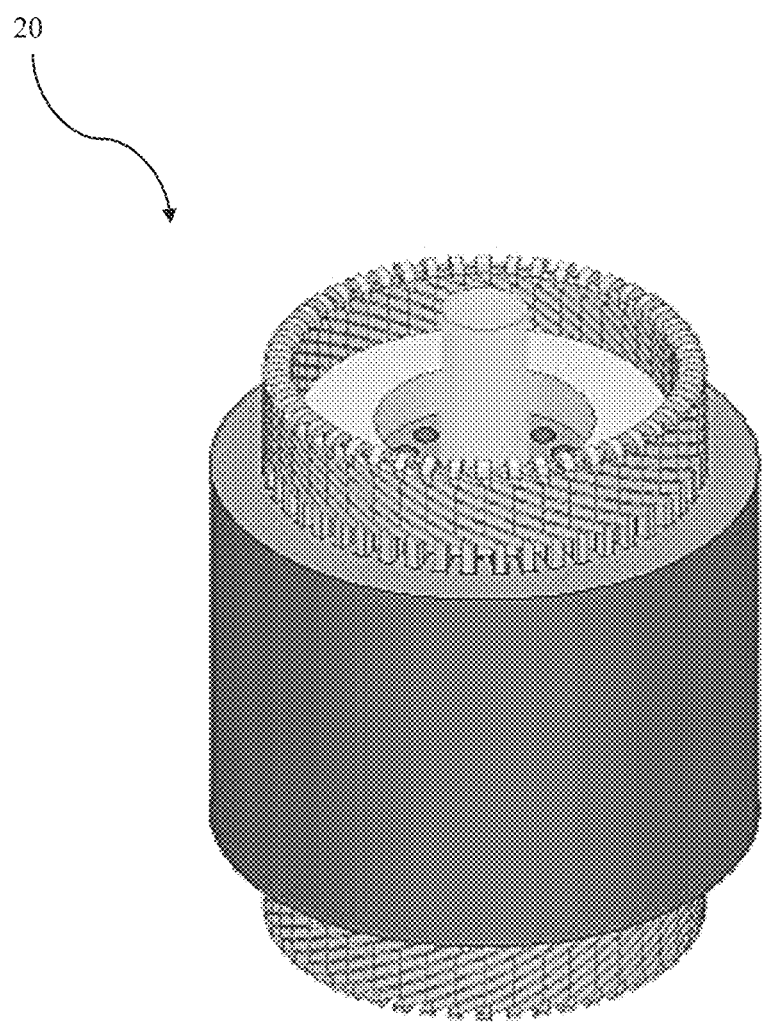
FIG. 2 is a combined schematic representation of an embodiment representing stator body assembly, rotor body assembly and the shaft of the induction motor of FIG. 1 in accordance with the present disclosure.

FIG. 2 is a combined schematic representation of an embodiment representing stator body assembly, rotor body assembly and the shaft 20 of the induction motor 10 of FIG. 1 in accordance with the present disclosure. At first, stator winding present in the stator is supplied with power, owing to which a magnetic flux gets produced in the stator as there is flow of current in the winding. The rotor winding is so arranged that each rotor coil becomes short-circuited.

The flux from the stator cuts the short-circuited coil in the rotor. As the rotor coils are short-circuited, according to Faraday's law of electromagnetic induction, the current will start flowing through the coil of the rotor. When the current through the rotor coils flows, another flux gets generated in the rotor. In such exemplary operation, the rotor flux will be lagging in respect of the stator flux. Because of that, the rotor will feel a torque which will make the rotor to rotate in the direction of the rotating magnetic field.

Figure 3:
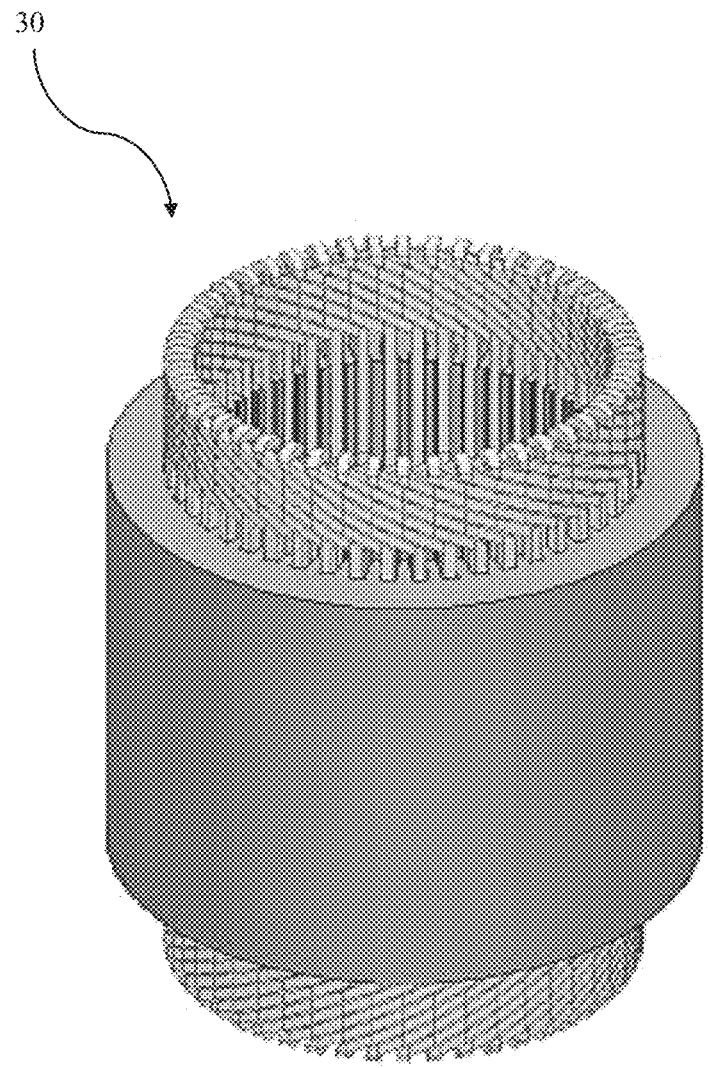
FIG. 3 is a schematic representation of an embodiment representing stator body assembly of the induction motor of FIG. 2 in accordance with the present disclosure.
Figure 4:
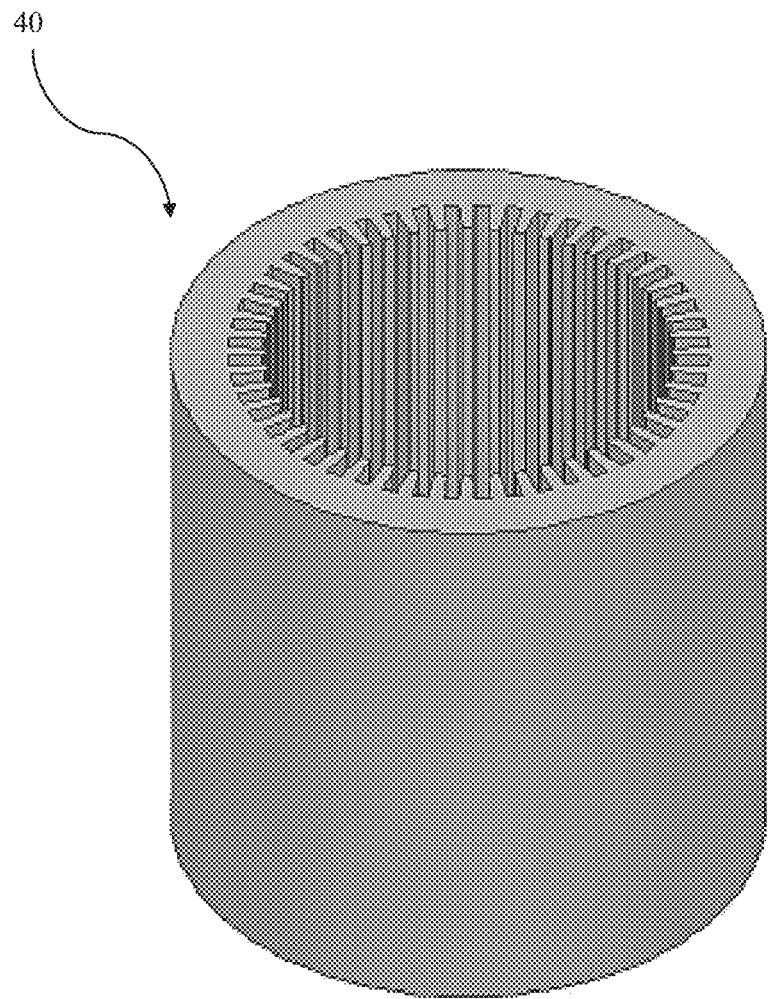
FIG. 4 is a schematic representation of an embodiment representing hollow cylindrical stator stack of the stator body assembly of FIG. 3 in accordance with the present disclosure.
Figure 5:
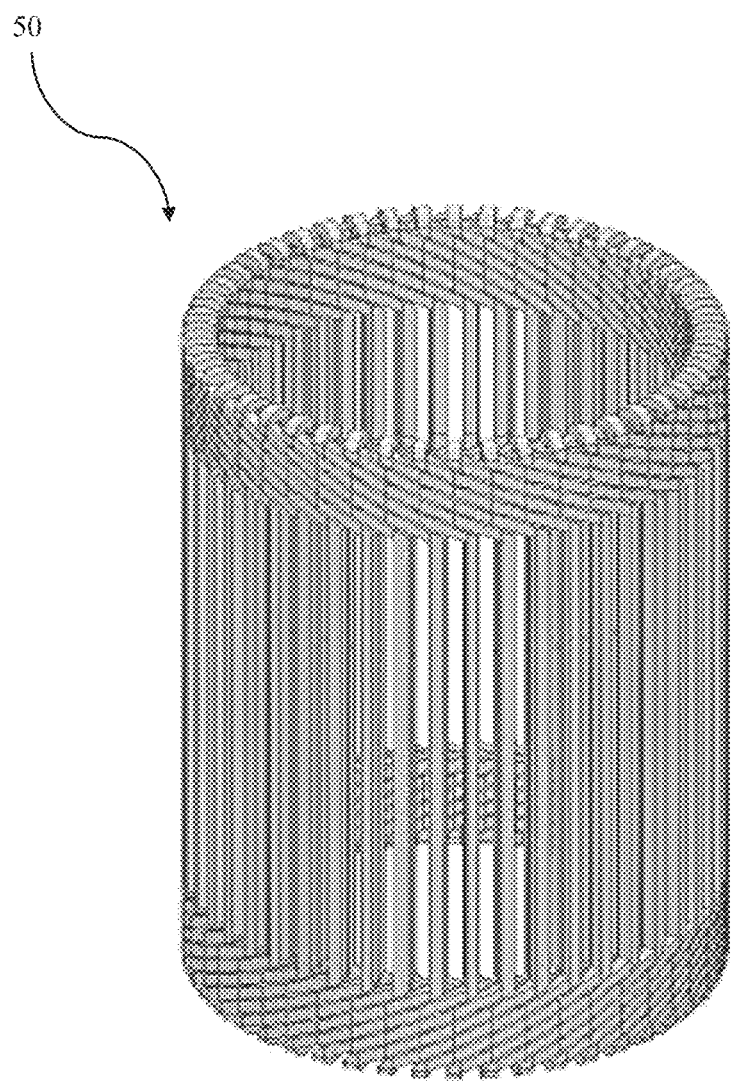
FIG. 5 is a schematic representation of an embodiment representing set of intertwined stator rods of the stator body assembly of FIG. 3 in accordance with the present disclosure.

FIG. 3 is a schematic representation of an embodiment representing stator body assembly 30 of the induction motor of FIG. 2 in accordance with the present disclosure. The stator body assembly is characterized by a hollow cylindrical stator stack 40 (as shown in FIG. 4) and a set of intertwined stator rods 50 (as shown in FIG. 5). It is pertinent to note that the dimension of the hollow cylindrical stator stack 40 and the set of intertwined stator rods 50 depends on the output requirement from the induction motor.

Figure 6:
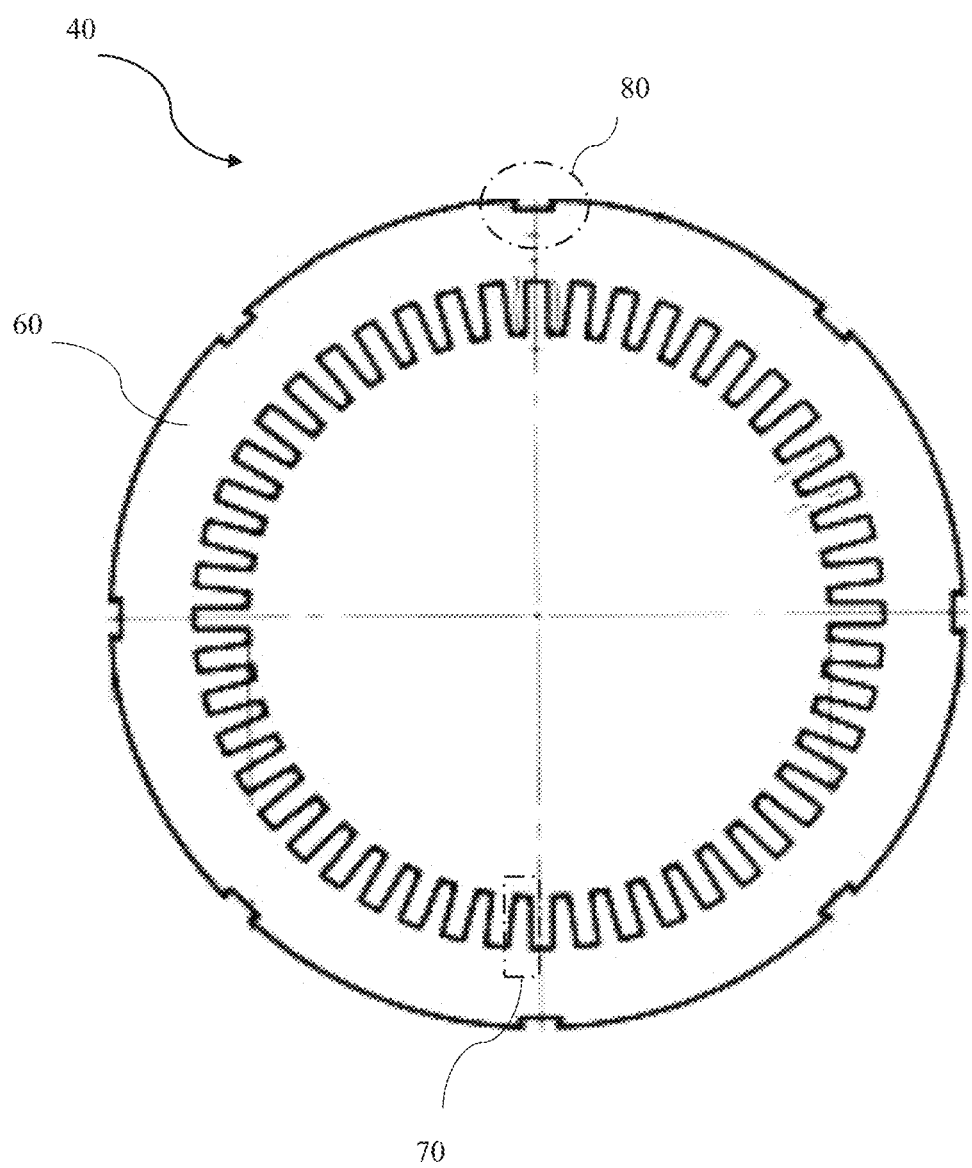
FIG. 6 is an exemplary line drawing representation of an embodiment representing top view of the hollow cylindrical stator stack of the stator body assembly of FIG. 3 in accordance with the present disclosure.

FIG. 4 is a schematic representation of an embodiment representing hollow cylindrical stator stack 40 of the stator body assembly 30 of FIG. 3 in accordance with the present disclosure. The hollow cylindrical stator stack 40 is fabricated with a plurality of rectangular shaped open slots 70 (as shown in FIG. 6) on inner surface periphery and a plurality of cleating notches 80 (as shown in FIG. 6) on outer surface periphery. In such embodiment, the rectangular dimensions of the slots 70 are in accordance with the dimension of the hollow cylindrical stator stack 40. In such embodiment, dimensions of each of the plurality of cleating notches 80 is also in accordance with the dimension of the hollow cylindrical stator stack 40.

It is pertinent to note that the plurality of rectangular shaped open slots 70 (as shown in FIG. 6) is equispaced and distributed around the hollow cylindrical stator stack 40. In such embodiment, two adjacent sides of each of the plurality of rectangular shaped open slots 70 is being fabricated with corresponding two v-shaped depressions 100 (as shown in FIG. 7 (a)) of pre-defined dimensions.

Furthermore, each of the plurality of cleating notches 80 (as shown in FIG. 6) are equispaced and distributed around the hollow cylindrical stator stack 40. In such embodiment, each of plurality of cleating notches 70 is fabricated with a c-shaped depression (20 (as shown in FIG. 7 (c)) of pre-defined dimensions on the outer surface. The c-shaped depression 120 is configured to align the separately cut stampings perfectly. During the lamination manufacturing process, the steel sheet is rotated by 90° before each stamping is cut. This ensures that height of the complete stack and level of the stack.

FIG. 5 is a schematic representation of an embodiment representing set of intertwined stator rods 50 of the stator body assembly 30 of FIG. 3 in accordance with the present disclosure. The set of intertwined stator rods 50 is configured as stator windings and housed within the plurality of rectangular shaped open slots 70 (as shown in FIG. 6). Each rod of the set of intertwined stator rods 50 is being aligned along the two v-shaped depressions 100 (as shown in FIG. 7 (a)) of each of plurality of rectangular shaped open slots 70 (as shown in FIG. 6). The intertwining of stator rods 50 with v-shaped depressions 100 provide tight fitting of the stator components.

FIG. 6 is an exemplary line drawing representation of an embodiment representing the top view of the hollow cylindrical stator stack 40 of the stator body assembly 30 of FIG. 3 in accordance with the present disclosure. Such exemplary embodiment clearly showcases the equal distribution of rectangular open slots 70 and the distribution of cleating notches 80 over the stator core 60 of a 120 kW EV motor. The outer periphery diameter of the showcased hollow cylindrical stator stack 40 is of 390 mm. The inner periphery diameter of the showcased hollow cylindrical stator stack 40 is of 265 mm. In the stated exemplary embodiment, the hollow cylindrical stator stack 40 has about 48 rectangular open slots 70 and 8 cleating notches 80.

It is important to note that the operating performance of any induction motors depends upon the shape of the slots and hence it is important to select suitable slot shape for the stator slots. Here, cleating notches 80 are present on the outer surface for tightly fitting along with the stator stack.

FIG. 7 (a) is an exemplary line drawing representation of an embodiment representing a single rectangular shaped open slot 70 corresponding to the hollow cylindrical stator stack 40 in accordance with the present disclosure. The exemplary line drawing representation portrays a single rectangular open slot 70. Here, in the single rectangular slot 90, each two adjacent sides have a v-shaped depression 100. Such depression 100 enables tight fitting of the stator rods as they are placed in the stator core. As shown in FIG. 7 (a), two adjacent slots 100 are in a gap of 7.5°. As shown, the length of each rectangular slot 90 is of 25.10 mm and the breadth is of 10.20 mm. The stator rods are positioned in between the showcased gap 110. The dimension of the length from the v-shaped depression 100 to the close rectangular slot 70 end is of 22.30 mm.

FIG. 7 (b) is an exemplary line drawing representation of an embodiment representing a v-shaped depression 100 corresponding to the single rectangular shaped open slot 90 of FIG. 6 in accordance with the present disclosure. Each v-shaped depression 100 is located near to the open end and the depression length is of 2.80 mm. Distance between the last end of the v-shaped depression 100 to the open rectangular slot end 90 is 0.80 mm. Here, distance between tip of the two adjacent v-shaped depression 100 in the rectangular open slot 90 is of 12.20 mm.

FIG. 7 (c) is an exemplary line drawing representation of an embodiment representing a single cleating notch 80 with c-shaped depression in accordance with the present disclosure. It is pertinent to note that each cleating notch 80 is apart at an angle of 45° around the outer surface periphery. The spread of the showcased single cleating notch 80 is of 49.52°. Here, the showcased c-shaped depression 120 of a single cleating notch 80 enables tight fitting of the stator frame to the stator body assembly 40. Length and breadth of the single cleating notch 80 is of 15.89 mm and 4.60 mm respectively.

Figure 8:
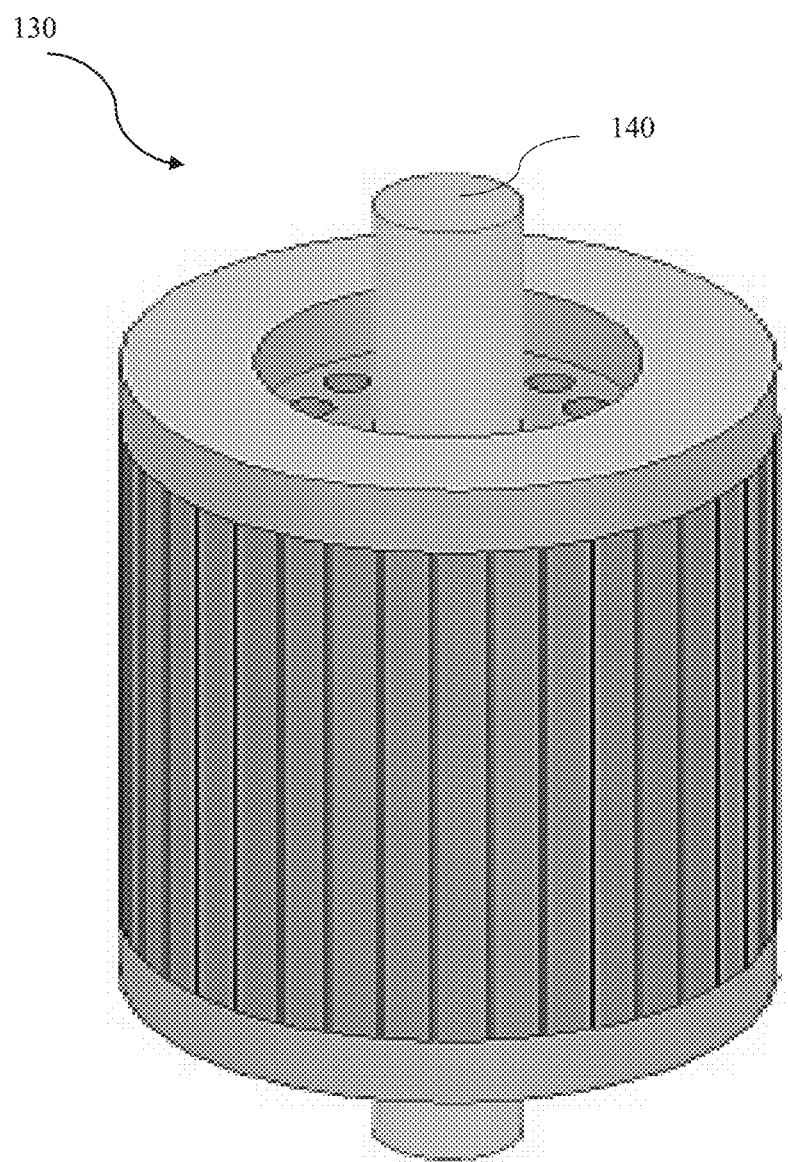
FIG. 8 is a schematic representation of an embodiment representing rotor body assembly of the induction motor of FIG. 2 in accordance with the present disclosure.

FIG. 8 is a schematic representation of an embodiment representing rotor body assembly 130 of the induction motor of FIG. 2 in accordance with the present disclosure. A rotor body assembly 130 housed within the stator body assembly 40. The rotor body assembly is configured to mount over shaft 140 of the induction motor 10. The rotor body assembly 130 is characterized by a hollow cylindrical rotor stack and a set of rotor bars.

Figure 9:
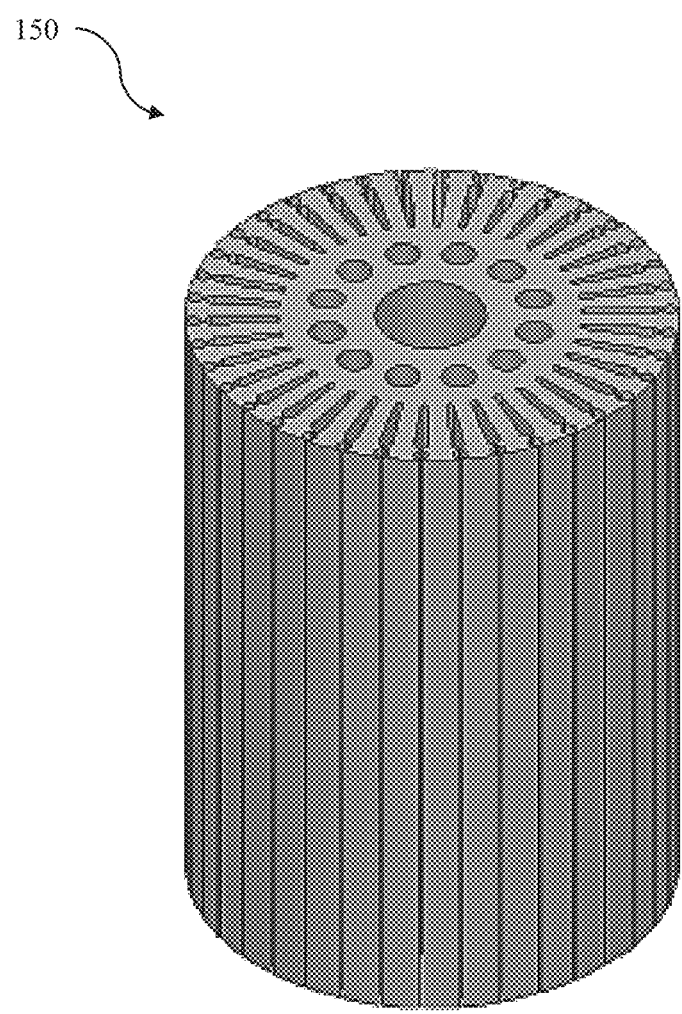
FIG. 9 is a schematic representation of an embodiment representing hollow cylindrical rotor stack of the rotor body assembly of FIG. 8 in accordance with the present disclosure.

FIG. 9 is a schematic representation of an embodiment representing hollow cylindrical rotor stack 150 of the rotor body assembly 130 of FIG. 8 in accordance with the present disclosure. The hollow cylindrical rotor stack 150 is fabricated With a plurality of predesigned rotor slots on outer surface periphery, a plurality of vent holes and a notch of predefined dimension on inner surface periphery (not shown in FIG. 9).

Figure 11:
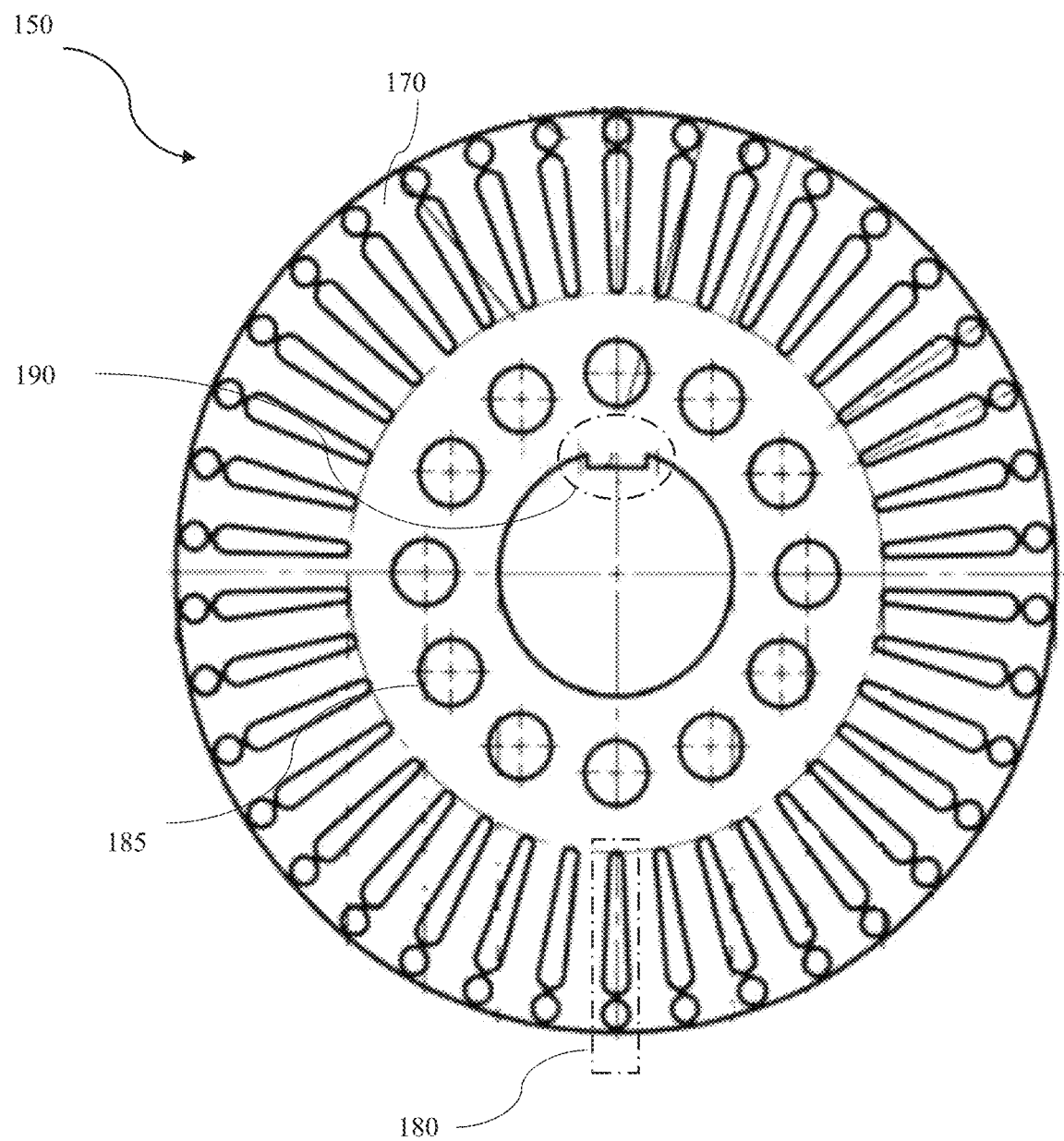
FIG. 11 is an exemplary line drawing representation of an embodiment representing top view of the hollow cylindrical rotor stack of the rotor body assembly of FIG. 8 in accordance with the present disclosure.

In such embodiment, each of the plurality of predesigned rotor slots 180 (as shown in FIG. 11) are equispaced and distributed around the hollow cylindrical rotor stack 150. The notch 190 (as shown in FIG. 11) is fabricated with a c-shaped depression of predefined dimensions. The notch 190 (as shown in FIG. 11) is configured to align with the shaft 140 of the induction motor 10 corresponding to the rotor body assembly 130. In one specific embodiment, the shaft 140 of the induction motor 10 is fabricated with a c-shaped protrusion for proper alignment with the notch 190 (as shown in FIG. 11) on inner surface periphery of the rotor body assembly 130.

Each of the plurality of vent holes 185 (as shown in FIG. 11) of pre-defined diameter are equispaced and distributed around the hollow cylindrical rotor stack (150). In such embodiment, the plurality of vent holes 185 (as shown in FIG. 11) is configured to provide air ventilation pathways for cooling of rotor body assembly 130.

Figure 10:
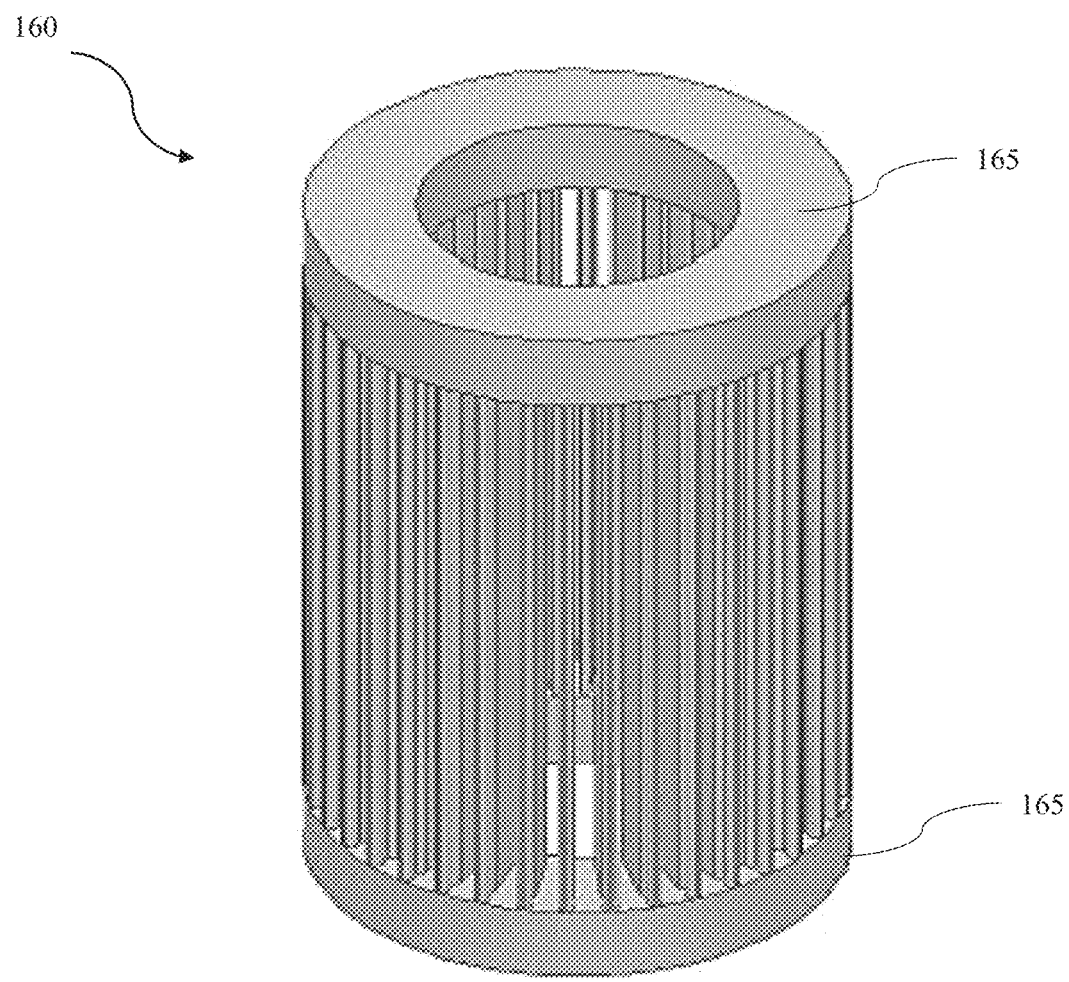
FIG. 10 is a schematic representation of an embodiment representing set of rotor bars of the rotor body assembly of FIG. 8 in accordance with the present disclosure.

FIG. 10 is a schematic representation of an embodiment representing set of rotor bars 160 of the rotor body assembly of FIG. 8 in accordance with the present disclosure. The set of rotor bars 160 is configured as rotor windings and housed within the plurality of predesigned rotor slots 180 (as shown in FIG. 11). In one specific embodiment, the set of rotor bars are interlocked with two rings 165 on both sides of the rotor body assembly 130 for proper fitting.

FIG. 11 is an exemplary line drawing representation of an embodiment representing top view of the hollow cylindrical rotor stack 150 of the rotor body assembly 130 of FIG. 8 in accordance with the present disclosure. Such exemplary embodiment clearly showcases the equal distribution of pre-designed rotor slots 180, the distribution of vent slots 185 and pre-positioned notch 190 of a 120 KW EV motor. The outer periphery diameter of the showcased the hollow cylindrical rotor stack 170 is 265 mm. The inner periphery diameter of the showcased the hollow cylindrical rotor stack 170 is 70.50 mm. The hollow cylindrical rotor stack 170 has about 38 rotor slots 180 and 12 vent slots 185. Here, vent slots 185 are present on the inner side of the rotor body to provide air ventilation pathways for cooling of rotor body assembly 130.

Figure 12:
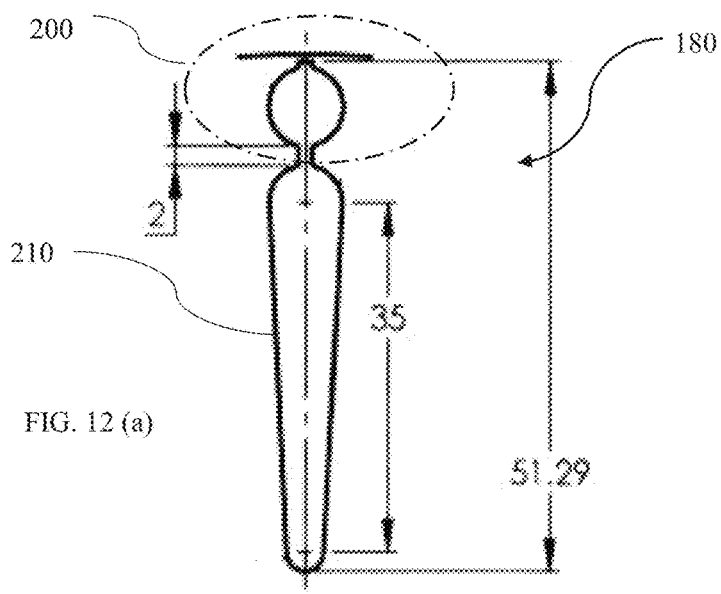
FIG. 12 (a) is an exemplary line drawing representation of an embodiment representing a single predesigned rotor slot corresponding to the hollow cylindrical rotor stack in accordance with the present disclosure.
Figure 12:
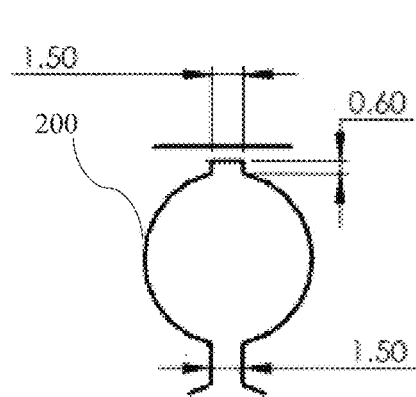
Figure 12:
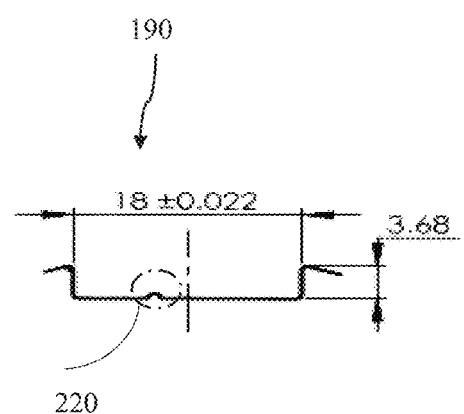

FIG. 12 (*a*) is an exemplary line drawing representation of an embodiment representing a single predesigned rotor slot 180 corresponding to the hollow cylindrical rotor stack 150 in accordance with the present disclosure. The exemplary line drawing representation portrays the pre-designed slots 180. As shown in FIG. 11, two adjacent slots 180 are in a gap of 9.470. As shown, the length of each slot 180 is of 51.29 mm. Every slot 150 is a combination of two portions, upper circular portion 200 and lower triangular portion 210. The lower triangular portion 210 is of 35 mm length. Narrow stretch between the upper circular portion 200 and lower triangular portion 210 is of 2 mm. Fabricated narrow stretch is of 1.50 mm length.

FIG. 12 (*b*) is an exemplary line drawing representation of an embodiment representing upper circular portion 200 of the single predesigned rotor slot 180 corresponding to the hollow cylindrical rotor stack 150 in accordance with the present disclosure. The upper circular portion 200 of each of the slots 180 comprises an outward protrusion for proper fitting. The outward protrusion is of 0.60 mm breadth.

FIG. 12 (*c*) is an exemplary line drawing representation of an embodiment representing a notch 190 with a c-shaped depression 220 fabricated with the hollow cylindrical rotor stack 150 in accordance with the present disclosure. It is pertinent to note that notch 190 length is of 18 mm and breadth is of 3.68 mm. Here, the showcased c-shaped depression 220 of the notch enables tight fitting of the shaft during operation.

Figure 13:
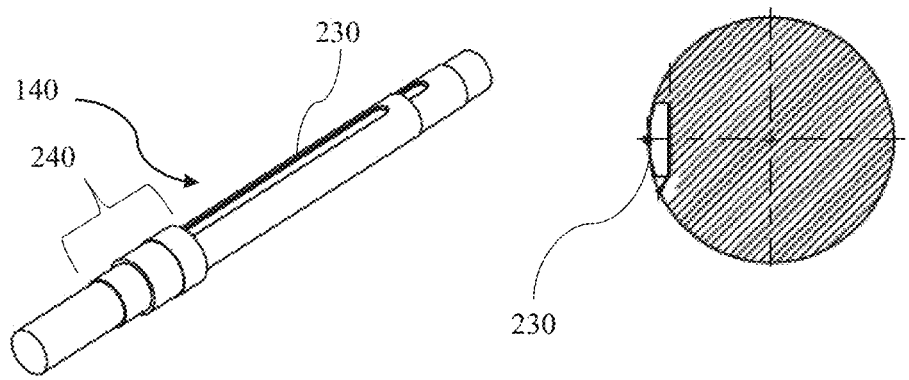
FIG. 13 (a) is an exemplary line drawing representation of an embodiment representing the shaft in accordance with the present disclosure.
Figure 13:
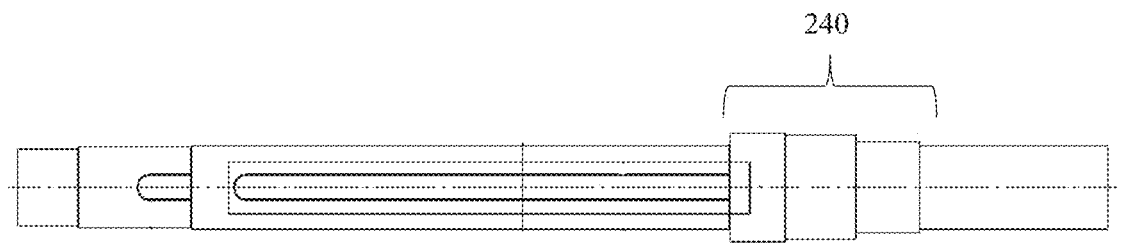

FIG. 13 (*a*) is an exemplary line drawing representation of an embodiment representing the shaft 140 in accordance with the present disclosure. The shaft 140 of pre-defined diameter is fabricated with a depression 230 for proper alignment with the notch (as shown in FIG. 13 (*b*)) on inner surface periphery of the rotor body assembly 130.

FIG. 13 (*b*) is an exemplary line drawing side representation of the depression corresponding to the shaft 140 in accordance with the present disclosure. The depression 230 is fabricated with length of 18 mm and breadth of 5.5 mm. In one specific embodiment, the depression 230 is fabricated with a c-shaped protrusion for proper alignment with the rotor notch's c-shaped depression (as shown in FIG. 12 (*c*)) on inner surface periphery of the rotor body assembly 130.

FIG. 13 (*c*) is an exemplary line drawing horizontal representation of the shaft 140 in accordance with the present disclosure. The shaft 140 is characterized by one or more equispaced steps 240 on both axial ends for aligning mounted induction motor 10 components. In such embodiment, the diameter of each of the one or more steps 240 increases with decrease in distance from both axial end of the induction motor 10.

Figure 14:
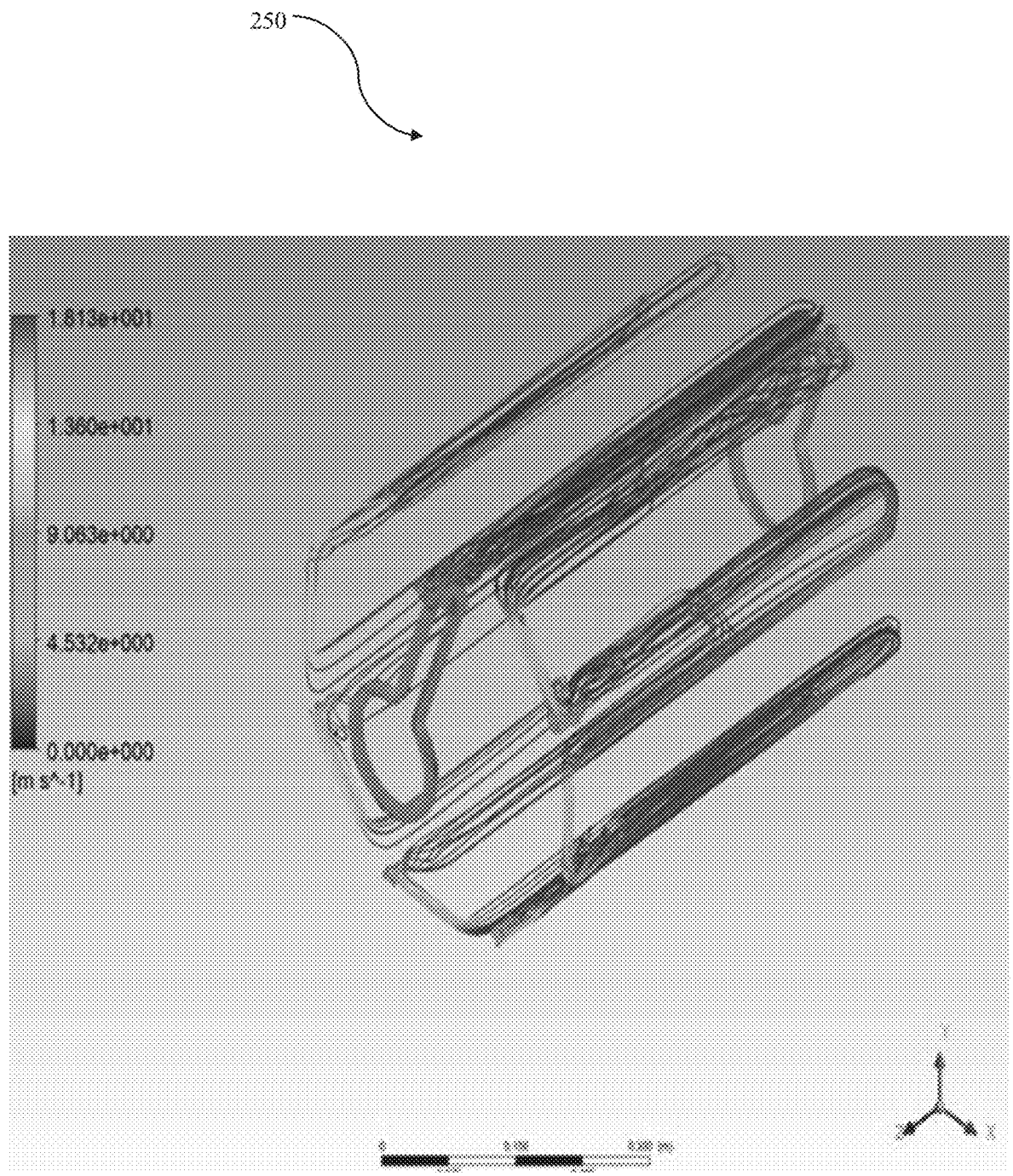
FIG. 14 is a schematic representation of experimental deformation distribution for the fine mesh corresponding to the induction motor in accordance with the present disclosure.

FIG. 14 is a schematic representation of experimental deformation distribution for the fine mesh 250 corresponding to the induction motor 10 in accordance with the present disclosure. The representation 250 clearly shows whole distribution of the deformation over the components corresponding to the induction motor (10). Here, the deformation varies from minimum 0 mm to maximum 0.7404 mm.

Figure 15:
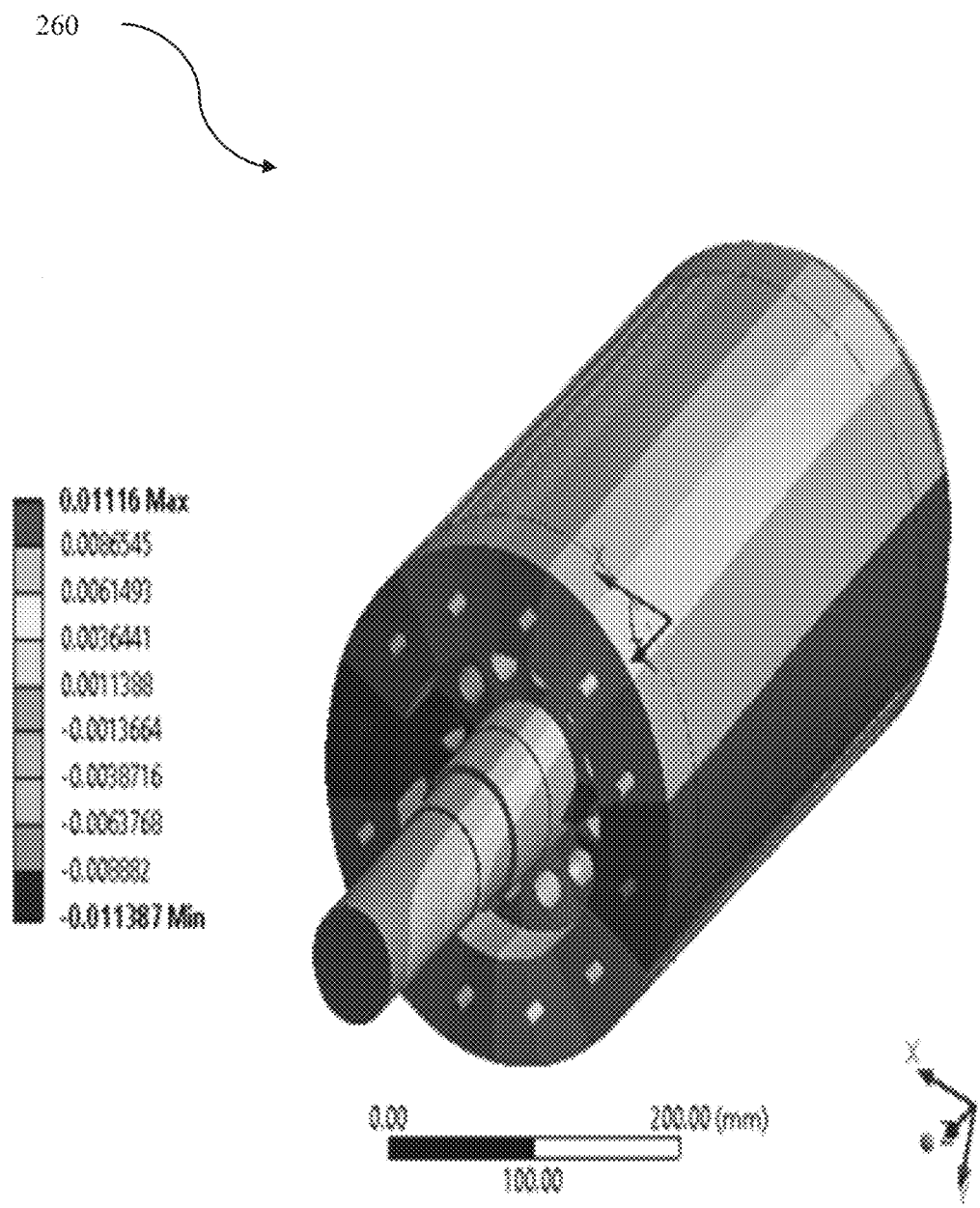
FIG. 15 is a schematic representation of experimental radial deformation distribution for the fine mesh corresponding to the induction motor shaft in accordance with the present disclosure.

FIG. 15 is a schematic representation of experimental radial deformation distribution 260 for the fine mesh corresponding to the induction motor shaft in accordance with the present disclosure. Here, X-axis directional deformation varies from minimum −0.011387 mm to maximum +0.01116 mm.

Figure 16:
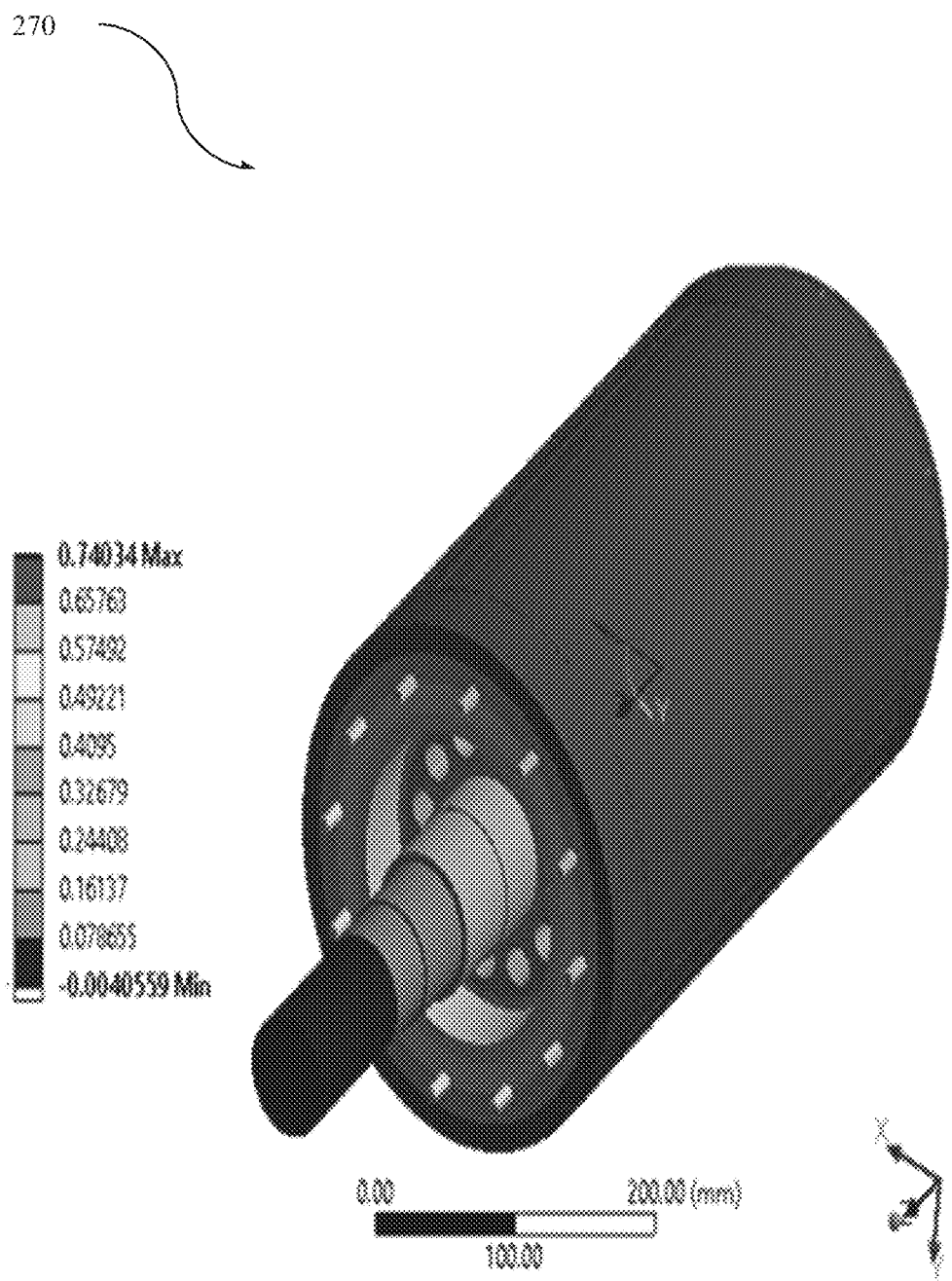
FIG. 16 is a schematic representation of experimental angular twist deformation distribution for the fine mesh corresponding to the induction motor shaft in accordance with the present disclosure.

FIG. 16 is a schematic representation of experimental angular twist deformation distribution 270 for the fine mesh corresponding to the induction motor shaft in accordance with the present disclosure. Here, Y-axis directional deformation varies from minimum −0.0040559 mm to maximum +0.74034 mm.

Figure 17:
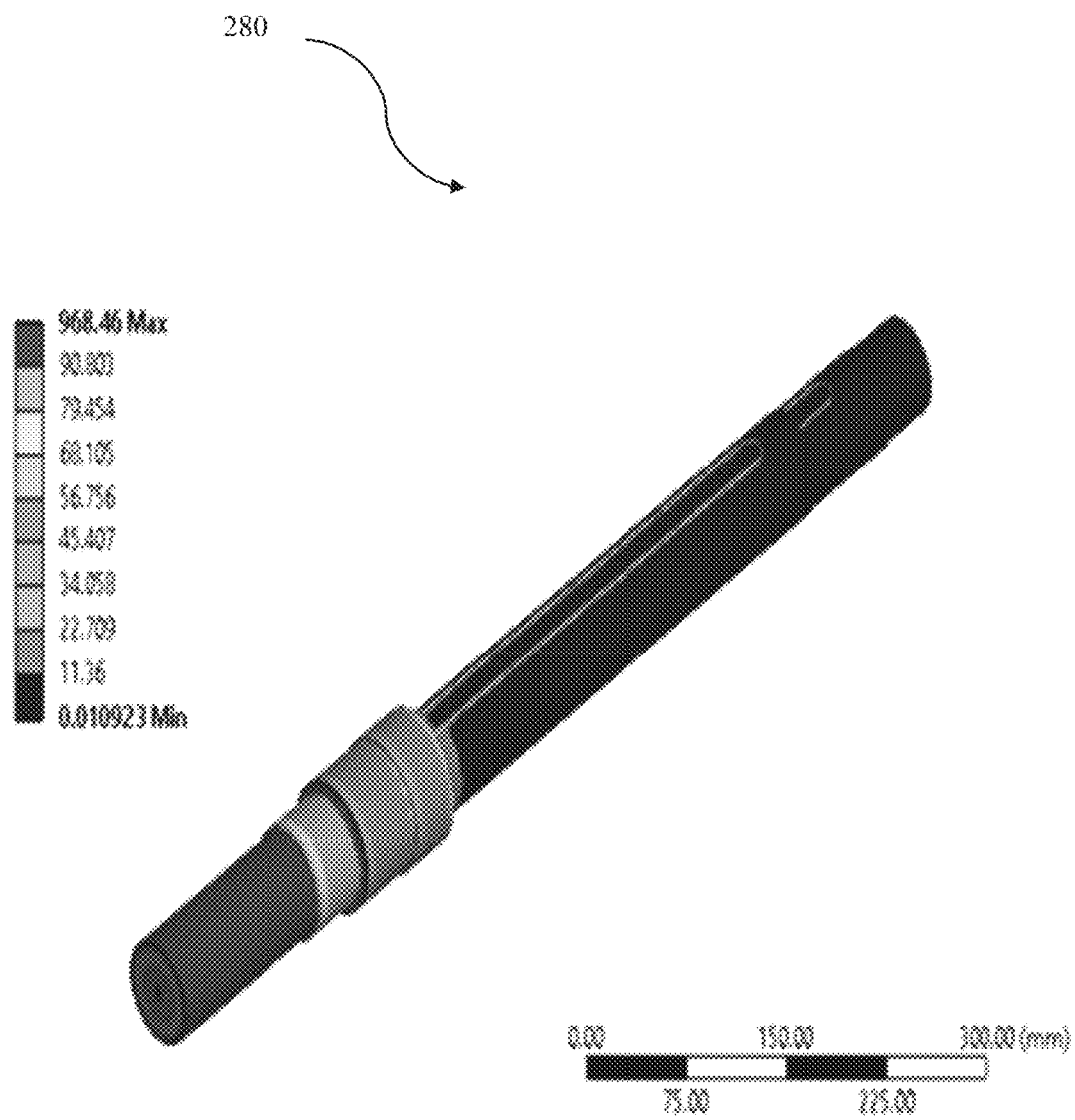
FIG. 17 is a schematic representation of experimental stress (Von-Mises) distribution corresponding to the shaft in accordance with the present disclosure.

FIG. 17 is a schematic representation of experimental stress (Von-Mises) distribution corresponding to the shaft 280 in accordance with the present disclosure, Here, the stress varies from minimum 0.010923 MPa to maximum 968.46 MPa.

The induction motor is structurally optimised so that it may be safely used in electric vehicles with minimal structural stress and deformation. Present disclosure of specially designed induction motor meets the automotive requirements such as ability to bear shocks having an amplitude of 15 g, and 3 g continuous vibrations. The results of shock tests and vibration tests favours suitability of the present induction motor in automotive segment such as, but not limited to, electric vehicles. Further the fabricated motor may be retrofitted with different electric vehicles for efficient use. The vent holes as fabricated in the motor, adds real time cooling feature to motor attributes.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shows; nor do all of the acts need to be necessarily performed. Also, those acts that are not dependent on other acts may be performed in parallel with the other acts. The scope of embodiments is by no means limited by these specific examples.

We claim:

1. An induction motor, comprising:
   a stator body assembly, wherein the stator body assembly is characterized by:
      a hollow cylindrical stator stack fabricated with a plurality of rectangular shaped open slots on inner surface periphery and a plurality of cleating notches on outer surface periphery,
         wherein the plurality of rectangular shaped open slots is equispaced and distributed around the hollow cylindrical stator stack,
         wherein two adjacent sides of each of the plurality of rectangular shaped open slots is being fabricated with corresponding two v-shaped depressions of pre-defined dimensions,
         wherein each of the plurality of cleating notches are equispaced and distributed around the hollow cylindrical stator stack,
         wherein each of plurality of cleating notches is fabricated with a c-shaped depression of pre-defined dimensions on the outer surface; and
      a set of intertwined stator rods configured as stator windings and housed within the plurality of rectangular shaped open slots, wherein each rod of the set of intertwined stator rods is being aligned along the two v-shaped depressions of each of plurality of rectangular shaped open slots; and
   a rotor body assembly housed within the stator body assembly and configured to mount over a shaft of the induction motor, wherein the rotor body assembly is characterized by:
      a hollow cylindrical rotor stack fabricated with a plurality of predesigned rotor slots on outer surface periphery, a plurality of vent holes and a rectangular notch of predefined dimension on inner surface periphery,
         wherein each of the plurality of predesigned rotor slots are equispaced and distributed around the hollow cylindrical rotor stack,
         wherein the rectangular notch is fabricated with a c-shaped depression of predefined dimensions and configured to align with the shaft of the induction motor corresponding to the rotor body assembly,
         wherein each of the plurality of vent holes of predefined diameter are equispaced and distributed around the hollow cylindrical rotor stack and configured to provide air ventilation pathways for cooling of rotor body assembly; and
      a set of rotor bars configured as rotor windings and housed within the plurality of predesigned rotor slots; and
   the shaft of pre-defined diameter and fabricated with a rectangular depression for proper alignment with the notch on inner surface periphery of the rotor body assembly,
      wherein the shaft is characterized by one or more equispaced steps on both axial ends for aligning mounted induction motor components,
      wherein diameter of each of the one or more equispaced steps increases with decrease in distance from both axial end of the induction motor.

2. The induction motor as claimed in claim 1, wherein pre-defined dimensions of the v-shaped depression is in accordance with dimension of the hollow cylindrical stator stack.

3. The induction motor as claimed in claim 1, wherein pre-defined dimensions of the c-shaped depression of each of plurality of cleating notches is in accordance with dimension of the hollow cylindrical stator stack.

4. The induction motor as claimed in claim 1, wherein pre-defined dimensions of the c-shaped depression of the notch is in accordance with dimension of the hollow cylindrical rotor stack.

5. The induction motor as claimed in claim 1, wherein pre-defined diameter of each of the plurality of vent holes is in accordance with dimension of the hollow cylindrical rotor stack.

6. The induction motor as claimed in claim 1, wherein the shaft of the induction motor is fabricated with a c-shaped protrusion over the rectangular depression for alignment with the c-shaped depression of the rectangular notch on inner surface periphery of the rotor body assembly.

7. The induction motor as claimed in claim 1, wherein the set of rotor bars are interlocked with two rings to fit on both sides of the rotor body assembly.

\* \* \* \* \*